United States Patent
Metz et al.

(10) Patent No.: US 7,316,455 B2
(45) Date of Patent: Jan. 8, 2008

(54) LOCKING DEVICE AND HEADREST

(75) Inventors: Daniel Metz, Strasbourg (FR); Daniel Navarro, Haguenau (FR); Bruno Jallon, Lingolsheim (FR); Ernst-Otto Fröse, Solingen (DE)

(73) Assignee: Johnson Controls GmbH, Burscheid (DE)

( * ) Notice: Subject to any disclaimer, the term of this patent is extended or adjusted under 35 U.S.C. 154(b) by 149 days.

(21) Appl. No.: 10/549,955

(22) PCT Filed: Mar. 16, 2004

(86) PCT No.: PCT/EP2004/002701

§ 371 (c)(1),
(2), (4) Date: Sep. 20, 2005

(87) PCT Pub. No.: WO2004/082987

PCT Pub. Date: Sep. 30, 2004

(65) Prior Publication Data

US 2006/0214491 A1    Sep. 28, 2006

(30) Foreign Application Priority Data

Mar. 20, 2003   (DE) ............................... 103 12 517

(51) Int. Cl.
*A47C 7/36* (2006.01)
(52) U.S. Cl. ..................................................... 297/410
(58) Field of Classification Search ................. 297/410
See application file for complete search history.

(56) References Cited

U.S. PATENT DOCUMENTS

| 3,563,602 | A | | 2/1971 | Ohta et al. | |
|---|---|---|---|---|---|
| 3,572,831 | A | * | 3/1971 | Barecki et al. | ......... 297/410 X |
| 4,671,573 | A | | 6/1987 | Nemoto et al. | |

FOREIGN PATENT DOCUMENTS

| DE | 296 13 073 U1 | 9/1996 |
|---|---|---|
| DE | 196 30 473 A1 | 1/1998 |
| EP | 0 864 461 A1 | 9/1998 |
| EP | 0 916 549 B1 | 5/1999 |

OTHER PUBLICATIONS

PCT International Preliminary Report on Patentability (Translation), based on International Application No. PCT/EP2004/002701, date of mailing Mar. 2, 2006 (7 pages).
Search Report by European Patent Office for International Application No. PCT/EP2004/002701; mailing date Jul. 16, 2004; 2 pages.

* cited by examiner

*Primary Examiner*—Rodney B. White
(74) *Attorney, Agent, or Firm*—Foley & Lardner LLP

(57) ABSTRACT

A locking device and a headrest are disclosed. The locking device includes spring elements, which can be engaged in at least one locking position and the locking device can be displaced in relation to at least two retaining bars that have a large number of recesses. The spring elements co-operate with the recesses in such a way that the engagement of the spring elements in their locking position locks the locking device in relation to the retaining bars. According to the invention, the spring elements are configured in such as way that the retaining bars are locked by the mechanical fixing of the spring elements in their central zone or by exertion of a force on the spring elements in their central zone.

20 Claims, 5 Drawing Sheets

LOCKING DEVICE AND HEADREST

CROSS REFERENCE TO RELATED APPLICATIONS

The present Application claims the benefit of priority to the following International Application: PCT Patent Application No. PCT/EP2004/002701 titled "Locking Device and Headrest" and filed on Mar. 16, 2004, which claims priority to German Patent Application No. DE10312517.5 titled "Locking Device and Headrest" and filed on Mar. 20, 2003 (which are both incorporated by reference in their entirety).

FIELD

The invention relates to a locking device. For motor vehicles, in particular, headrests are used which provide a user of the vehicle with increased comfort and increased security against possible sources of risks, for example in the case of accidents, by supporting or retaining body parts, in particular of the head.

BACKGROUND

Headrests of this type are generally provided in a manner such that they can be set, for example, to users of different heights. In order to set the headrests, the latter can be locked mechanically in a plurality of positions. The setting of the headrests is accomplished easily, simply and with little effort. At the same time, however, once a headrest is set and locked, resistance to forces which may potentially move the headrest out of the set position is desired. Headrests of this type and the individual parts of which they are composed are furthermore to be able to be produced and assembled simply and cost-effectively, with the result that the production of headrests of this type can be carried out simply, rapidly and cost-effectively.

For example, European patent specification EP 0 864 461 B1 discloses a headrest for motor vehicle seats with a rapid height adjustment. In this case, two wire springs are provided which can be bent by at least one actuating rod, so that the locking brought about by the two wire springs in their normal position is canceled. However, in the case of such a construction of a headrest, it is disadvantageously envisaged using two separate springs. Furthermore, special C-shaped springs are used which can only be fitted in a comparatively time-consuming manner, in a comparatively complicated manner and with a comparatively large exertion of force. Furthermore, the two springs used have a different locking effect, for example due to manufacturing fluctuations. On account of the use of two separate springs and two separate retaining rods, this has the effect of the support being possibly able to be positioned in different adjusting positions, i.e., for example, "obliquely", on the different retaining rods, which may result in disadvantageous consequences, in particular with regard to protecting occupants in motor vehicles in hazardous situations.

SUMMARY

The invention therefore provides a locking device in which the disadvantages of the locking devices known from the prior art are avoided.

Accordingly the locking device is provided in a manner such that it can be adjusted relative to at least two retaining rods, the locking device having spring elements which are provided in a manner such that they can be set at least into one locking position, the spring elements in their locking position, in interaction with recesses in the retaining rods, causing the locking device to be locked relative to the retaining rods, the spring elements being provided in such a manner that locking of the retaining rods can be brought about by a mechanical fixing of the spring elements in a central region or the locking of the retaining rods can be brought about by an application of force on the spring elements in a central region. In one embodiment of the locking device, the spring elements are provided as a single part. In a further embodiment of the locking device, the spring elements are provided as a spring extending in an elongate manner essentially between the two retaining rods. In a further embodiment of the locking device, the spring elements are provided in such a manner that they comprise at least one central part and end parts. Such locking devices have the advantage that the spring elements have a uniform locking effect on both retaining rods, since the locking effect for the alternative of exerting a force on the spring elements in the central region—in contrast to merely fixing the spring elements without a noticeable application of force on the spring elements—is brought about by a single elastic deformation of the spring, in particular in the central region of the spring elements.

In a another embodiment of the locking device, the spring elements, in addition to their locking position, are provided in a manner such that they can be set into a release position, the spring elements interacting with the recesses of the retaining rods in such a manner that, when the spring elements are set in their release position, the recesses are opened up. In a further embodiment of the locking device, the latter has a sliding element which can be set at least in a first position and in a second position, the spring elements interacting with the sliding element in such a manner that, when the sliding element is set into its first position, the spring elements take up their locking position and that, when the sliding element is set into its second position, the spring elements take up their release position. In a further embodiment of the locking device, the sliding element has a plurality of projections and the spring elements have a plurality of actuating regions, a movement of the sliding element parallel to a plane defined by the at least two retaining rods bringing about a movement of the actuating regions which is essentially vertical thereto. In a further embodiment of the locking device, the spring elements are elastically deformed by the movement of the actuating regions. In a further embodiment of the locking device, the actuating regions are of wedge-like design. In a further embodiment of the locking device, the locking device has a bearing point, the bearing point preventing a movement of the central region of the spring elements during the movement of the actuating regions. Such locking devices have the advantage of being able to be produced and fitted in a very simple and sturdy manner.

A further subject matter of the present invention is a headrest which is used, in particular, in a motor vehicle. The headrest is connected fixedly to a locking device. In particular, the design of the headrest is such that the locking device cannot be seen from outside the headrest or at most partially, for example through an actuating device. In this case, the headrest has a frame which has guide elements for retaining rods or is connected thereto. The retaining rods protrude in particular out of the upper boundary surface of a backrest of a seat of a motor vehicle, so that by setting of the backrest in a manner such that it is generally essentially vertical or is inclined slightly in relation to the vertical, the retaining rods are essentially vertical or likewise slightly inclined in relation to the vertical. Accordingly, the headrest is therefore height-adjustable with the retaining rods extending essentially vertically.

BRIEF DESCRIPTION OF THE FIGURES

The invention is explained in more detail below with reference to an exemplary embodiment which is illustrated in the drawing, in which.

DETAILED DESCRIPTION

Figure 1:
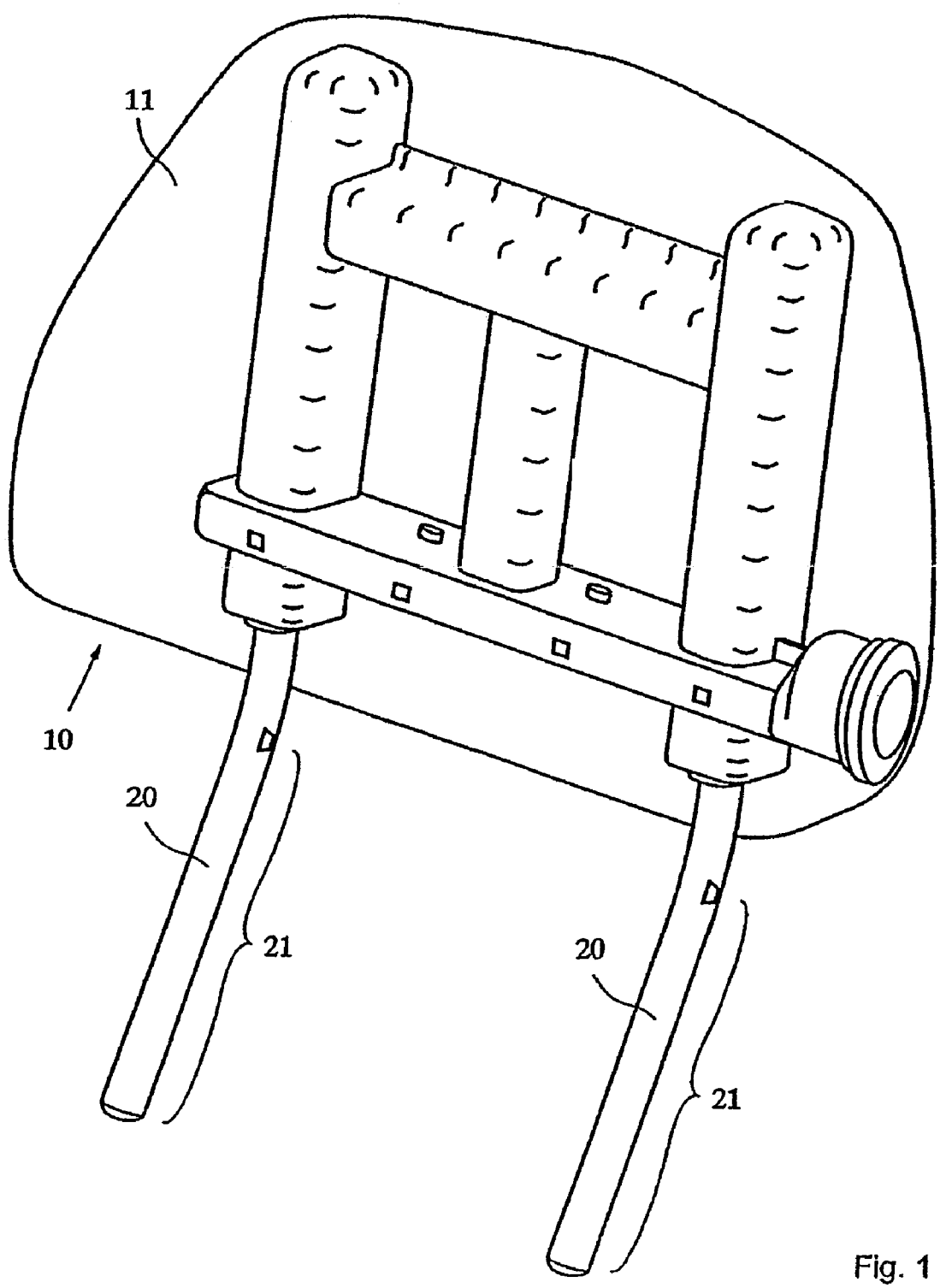
FIG. 1 shows a headrest with retaining rods and an indicated locking device according to the invention.

FIG. 1 illustrates a headrest 10 with retaining rods 20 and an indicated locking device. The retaining rods 20 here are fastened by their lower part 21 in particular in a backrest (not illustrated) of a seat of a motor vehicle. The headrest 10 has a comparatively soft material which is denoted by the reference number 11, which makes up the major part of the volume of the headrest 10 and serves for supporting and stabilizing the head of a user of the headrest.

Figure 2:
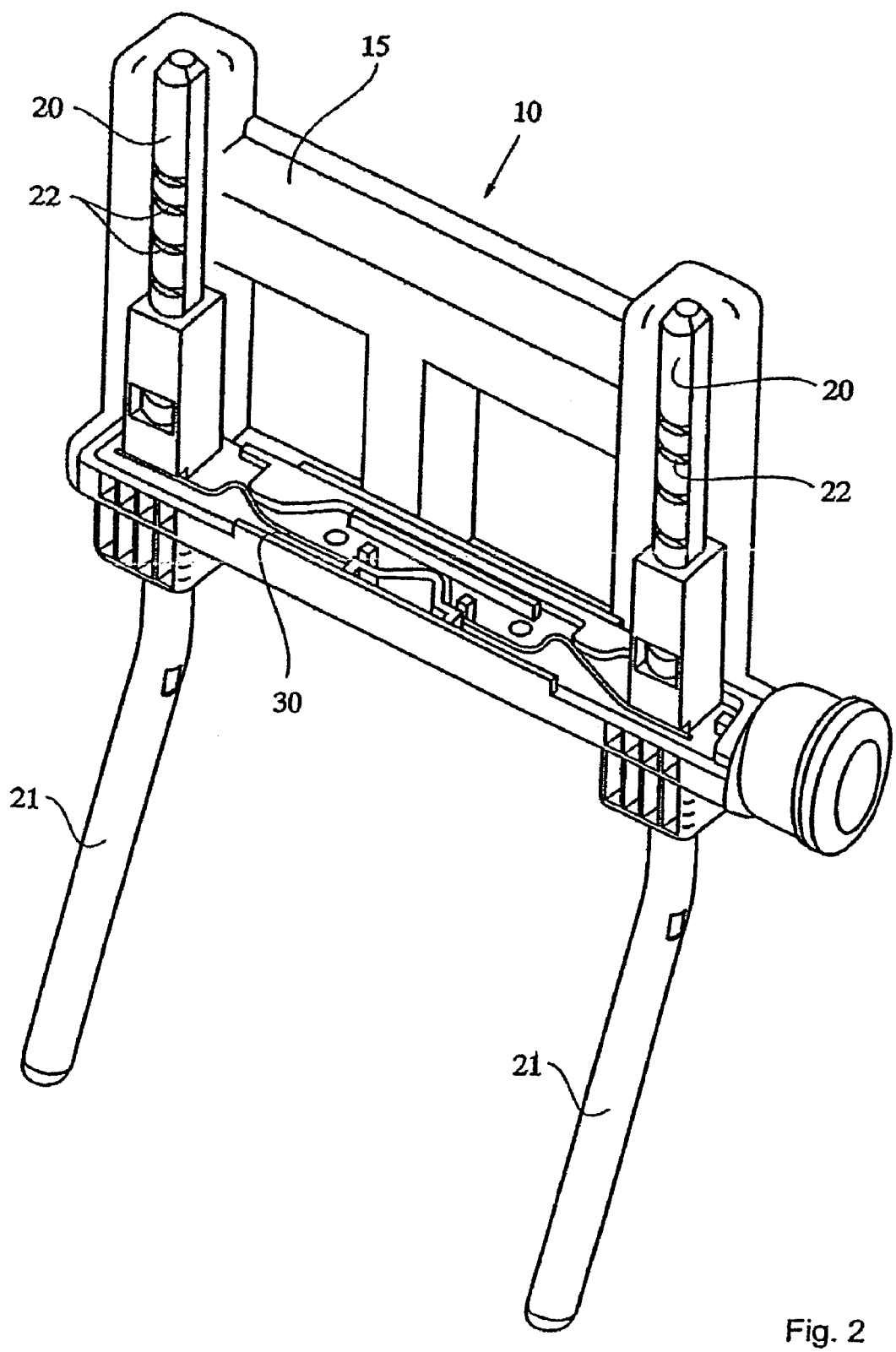
FIG. 2 shows part of a headrest with the locking device indicated.

FIG. 2 illustrates part of a headrest 10 with the locking device. In this case, the headrest 10 comprises a frame 15 which gives the headrest an inherent mechanical support. FIG. 2 furthermore illustrates the retaining rods 20, their recesses 22 and their lower parts 21. Recesses 22 are provided in particular as notches 22. Furthermore, FIG. 2 illustrates the spring elements 30. The spring elements 30 are provided as a spring 30 extending in an elongate manner between the retaining rods 20. In one embodiment of the invention, the spring 30 is provided as a single part formed of spring wire. In another embodiment of the invention, the spring 30 is provided in a central section, which is formed by a central part, as a plastic part and is provided in its end sections as a metal end part or as a plurality of metal end parts.

Figure 3:
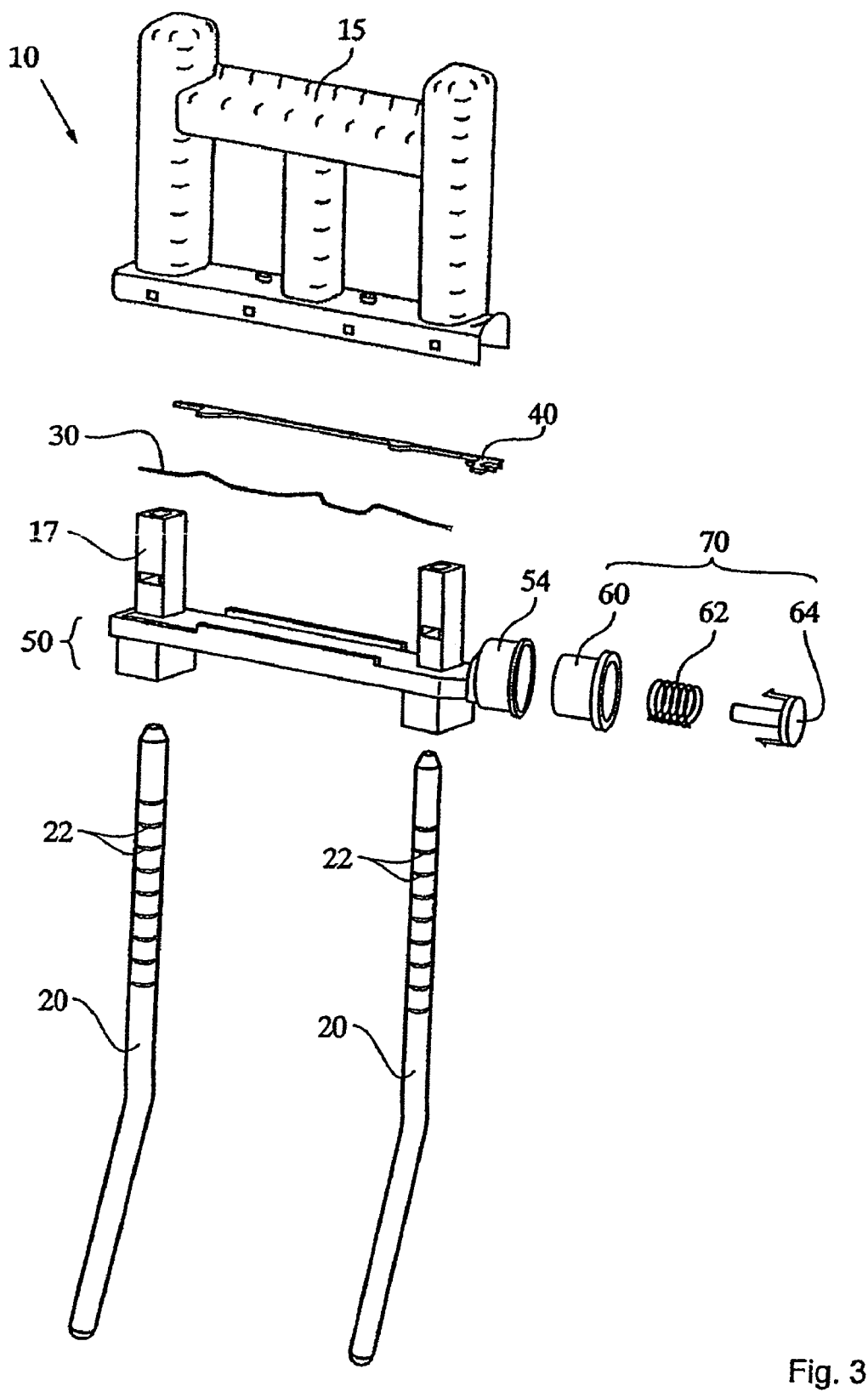
FIG. 3 shows an exploded drawing of individual parts of the headrest and in particular of the locking device.

FIG. 3 illustrates an exploded drawing of individual parts of the headrest 10 and in particular of the locking device. The headrest 10 comprises the frame 15 and guides 17 in which the retaining rods 20 are guided. The locking device has a support part 50 which bears the components required for locking the locking device relative to the retaining rods 20, and is at least partially mechanically fixed. The support part 50 is connected in particular to the guides 17 and is provided as a single part with them, for example as a plastic or metal injection-molded part. The spring 30 and a sliding element 40 are placed onto or into the support part 50, with both the spring 30 and the sliding element 40 being provided in a manner such that they can be moved mechanically within limits in or on the support part 50. The support part 50 has—connected as a single part in FIG. 3—a receptacle 54 for an actuating device 70. However, a receptacle (not illustrated) which is not provided as a single part with the support part 50 is likewise possible. The actuating device 70 includes an actuating guide 60, a restoring spring 62 and an actuating button 64. The actuating button 64 is connected mechanically to the sliding element 40 by a latching connection, and is accessible to a user (not illustrated in FIG. 3) of the locking device from outside the headrest 10. However, a different design of the actuating device 70 and a different connection of the sliding element 40 to a component of the actuating device 70 that is accessible to the user of the locking device is likewise possible.

Figure 4:
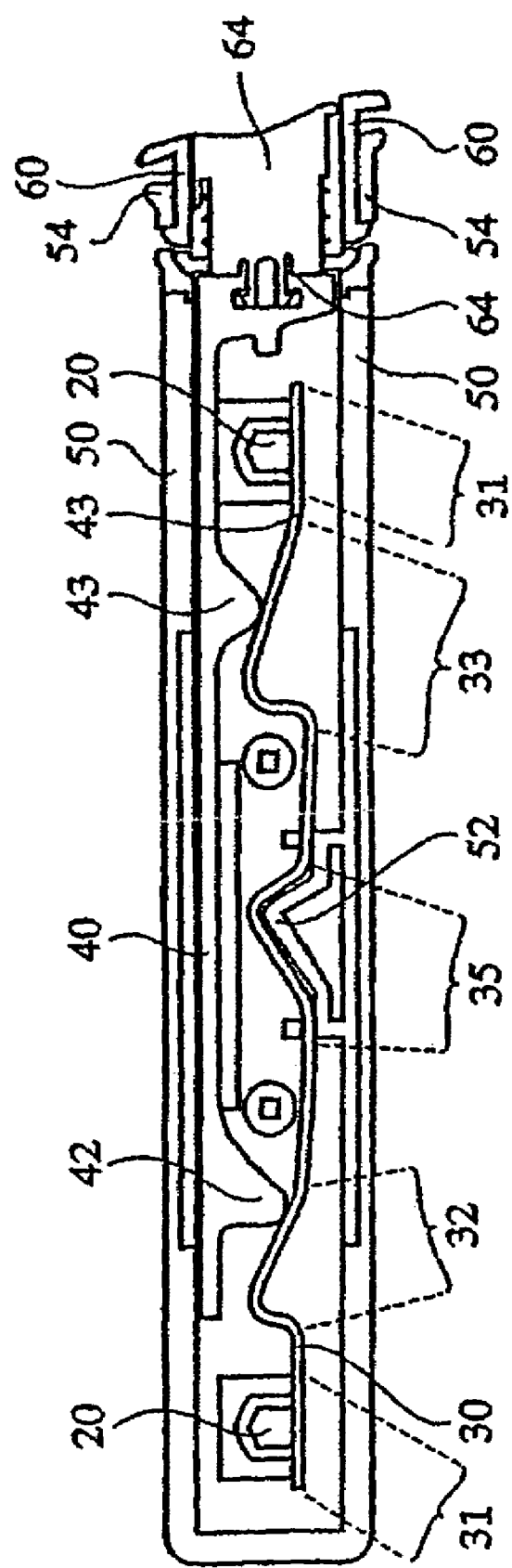
FIG. 4 shows a plan view in the direction of the retaining rods of the locking device, with the spring being situated in its locking position.
Figure 5:
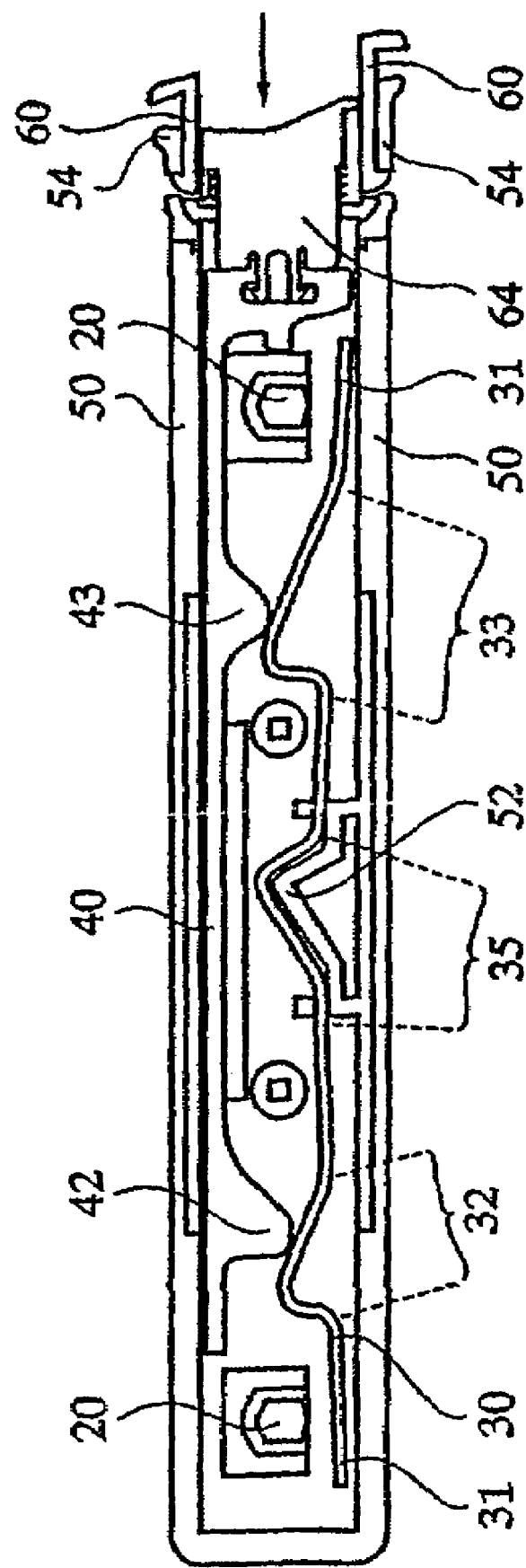
FIG. 5 shows a plan view in the direction of the retaining rods of the locking device, with the spring being situated in its release position.

FIG. 4 illustrates a plan view of the locking device in the direction of the retaining rods 20, with the spring 30 being situated in its locking position, and FIG. 5 illustrates a plan view of the locking device in the direction of the retaining rods 20, with the spring 30 being situated in its release position. The locking position of the spring 30 is characterized in that locking regions 31 of the spring 30 bear against the retaining rods 20. In this case, the sliding element 40 is set in a first position. This position is brought about in particular by the spring action of the restoring spring 62 (not illustrated in FIGS. 4 and 5) of the actuating device 70 on the actuating button 64 and therefore on the sliding element 40. The sliding element 40 has projections 42, 43 which can lead to a movement of the spring 30 during a movement of the sliding element 40. The first position of the sliding element 40, illustrated in FIG. 4, is characterized in that the projections 42, 43 bear against the spring 30 but do not exert a force on the spring. The exertion of such a force would impair the locking effect of the spring 30 on the retaining rods 20. In the exemplary embodiment illustrated, the locking regions 31 are provided in particular at the two ends of the spring 30 extending in an elongate manner. The locking of the retaining rods 20 relative to the locking device or relative to the headrest 10 is brought about by the locking regions 31 of the spring 30 engaging the recesses 22 (not illustrated in FIGS. 4 and 5) of the retaining rods 20. In this case, the spring 30 is already "prestressed" in its locking position and an application of force of the spring 30 on the retaining rods 20 is therefore provided. This application of force of the spring 30 is brought about by a bearing point 52 which is provided on the support part 50. In this connection, the support part 50, by means of the bearing point 52, exerts an application of force on the spring 30, in a central region 35 of the spring 30. This causes an elastic bending of the spring 30 in its central region 35, and therefore an exertion of force on both retaining rods 20 or on their recesses 22. The central region 35 of the spring 30 is provided approximately in the center between the retaining rods 20, but this is not necessarily the case.

In another embodiment, the spring 30 bears merely against the two retaining rods 20 and the bearing point 52. By the mechanical fixing of the spring 30 on the bearing point 52—in the central region 35—locking of the locking device relative to the retaining rods 20 is already provided. It is clear that, in the case of locking without application of force in the locking position of the spring 30, the ability to fit the spring 30 is facilitated.

The release position (illustrated in FIG. 5) of the spring 30 is characterized in that the locking regions 31 of the spring 30 release the retaining rods 20 and therefore open up the recesses 22, i.e. the locking regions 31 of the spring 30 are provided at a distance from the retaining rods 20. As a result, it is possible for the retaining rods 20 to be easily displaceable in their longitudinal direction, i.e. perpendicular with respect to the plane of the drawing in FIGS. 4 and 5, in relation to the locking device. The release position of the spring 30 is brought about, starting from its locking position, by the sliding element 40 being brought into its second position illustrated in FIG. 5. In this case, the sliding element 40 is displaced to the left, starting from its position in FIG.

4, relative to the support part 50, and the projections 42, 43 on the sliding element 40 together with wedge-like actuating regions 32, 33 of the spring 30 bring about a movement of the spring 30 into its release position. In this case, the locking regions 31 of the spring 30 move in a direction perpendicular with respect to the direction of movement of the sliding element 40. The movement of the sliding element 40 takes place here in a plane parallel to the plane which is perpendicular to the plane of the drawing in FIG. 5 and is defined by the two retaining rods 20.

In an alternative embodiment, in which the spring 30 is provided in a central section, which is formed by a central part, as a plastic part and with the spring being provided in its end sections as a metal end part or as a plurality of metal end parts, the embodiment contemplates that the end parts form the locking regions 31 and the central part forms the remaining sections of the spring 30, in particular the actuating regions 32, 33.

What is claimed is:

1. A locking device, comprising:
   a support part;
   a spring coupled to the support part and movable into at least one locking position and a release position;
   at least two retaining rods having a plurality of recesses movably coupled to the support part, the spring interacting with the recesses so that movement of the spring into the locking position causes the support part to be locked relative to the retaining rods and movement of the spring into the release position causes the spring to disengage the recesses; and
   a sliding element which can be set at least in a first position and in a second position, the spring interacting with the sliding element so that, when the sliding element is set into the first position, the spring is in the locking position and when the sliding element is set into the second position, the spring is the release position,
   wherein the spring is provided in such a manner that locking of the retaining rods can be brought about by at least one of fixing a central region of the spring and applying a force on the central region of the spring,
   wherein the sliding element has a plurality of projections, and the spring comprises a plurality of actuating regions, so that a movement of the sliding element parallel to a plane defined by the retaining rods results in a movement of the actuating regions which is essentially vertical thereto.

2. The locking device as claimed in claim 1, wherein the spring is provided as a single part.

3. The locking device as claimed in claim 1, wherein the spring extends in an elongate manner essentially between the retaining rods.

4. The locking device as claimed in claim 1, wherein the spring comprises at least one central part and end parts.

5. The locking device as claimed in claim 1, wherein the spring is movable in a direction perpendicular to a direction of movement of the sliding element.

6. The locking device as claimed in claim 5, wherein the sliding element is movable in a lateral direction relative to the support member when moving between the first position and the second position.

7. The locking device as claimed in claim 1, wherein the spring is elastically deformed by the movement of the actuating regions.

8. The locking device as claimed in claim 1, wherein the actuating regions comprise a wedge-like design.

9. The locking device as claimed in claim 1, wherein the support part comprises a bearing point configured to prevent movement of the central region of the spring during the movement of the actuating regions.

10. The locking device as claimed in claim 1, further comprising a headrest coupled to the retaining rods.

11. The locking device as claimed in claim 10, wherein the headrest interacts with the retaining rods in an essentially vertically oriented manner, so that the headrest is height-adjustable.

12. The locking device of claim 1, wherein the sliding member is biased by a restoring spring.

13. A headrest for a vehicle, comprising:
    a support part comprising a frame and a pair of guides, the support part attachable to a seat frame;
    a pair of retaining rods having a plurality of recesses and slidably interacting with the guides;
    an elongated spring interacting with the retaining rods and movable between a release position disengaged from the recesses and a locking position engaged with one of the recesses on the retaining rods; and
    a sliding element movable between a first position in which the spring is in a locked position to prevent movement of the retaining rods relative to the support part, and a second position in which the spring is in the released position to permit movement of the retaining rods relative to the support part,
    wherein the spring moves in a direction perpendicular to a direction of movement of the sliding element.

14. The headrest of claim 13, wherein the spring comprises a pair of actuating regions configured to engage the recesses of the retaining rods.

15. The headrest of claim 13, wherein the sliding element moves the spring member in a plane substantially perpendicular to the retaining rods.

16. The headrest of claim 13, wherein the support part further comprises a bearing point configured to prevent movement of a center region of the spring and the sliding element is operable to move ends of the spring.

17. The headrest of claim 13, wherein the sliding element is movable in a lateral direction relative to the support member when moving between the first position and the second position.

18. A headrest for a vehicle, comprising:
    a support part;
    a pair of retaining rods having a plurality of recesses and movably coupled to the support part;
    a spring interacting with the retaining rods and movable between a release position disengaged from the recesses and a locking position engaged with at least one of the recesses on the retaining rods; and
    a sliding element movable in a lateral direction relative to the support part, the sliding element operable in moving the spring from the locking position to the release position, permitting movement of the retaining rods relative to the support part.

19. The headrest of claim 18, wherein the spring moves in a direction that is different from the direction of movement of the sliding element.

20. The headrest of claim 18, wherein the support part comprises a bearing point configured to prevent movement of a central region of the spring during the movement of the sliding element between the first position and the second position.

* * * * *